(12) United States Patent
Yasuike et al.

(10) Patent No.: US 9,473,854 B2
(45) Date of Patent: Oct. 18, 2016

(54) ELECTRODYNAMIC EXCITER AND VEHICLE LAMP EMPLOYING THE SAME

(71) Applicants: STAR MICRONICS CO., LTD., Shizuoka-shi (JP); KOITO MANUFACTURING CO., LTD., Shizuoka-shi (JP)

(72) Inventors: Makoto Yasuike, Shizuoka (JP); Yasunori Tsukuda, Shizuoka (JP); Atsushi Sugimoto, Shizuoka (JP); Osamu Endo, Shizuoka (JP); Naoki Tatara, Shizuoka (JP)

(73) Assignee: KOITO MANUFACTURING CO., LTD., Shizuoka-Shi (JP)

( * ) Notice: Subject to any disclaimer, the term of this patent is extended or adjusted under 35 U.S.C. 154(b) by 241 days.

(21) Appl. No.: 14/281,988

(22) Filed: May 20, 2014

(65) Prior Publication Data
US 2014/0254191 A1    Sep. 11, 2014

Related U.S. Application Data

(63) Continuation of application No. PCT/JP2012/078661, filed on Nov. 6, 2012.

(30) Foreign Application Priority Data

Dec. 5, 2011    (JP) ................................. 2011-265485

(51) Int. Cl.
*H04R 9/04*    (2006.01)
*H04R 1/02*    (2006.01)
(Continued)

(52) U.S. Cl.
CPC ............. *H04R 9/046* (2013.01); *B60Q 1/0017* (2013.01); *B60Q 5/008* (2013.01); *G10K 9/13* (2013.01);
(Continued)

(58) Field of Classification Search
CPC ........ H04R 9/046; H04R 9/025; H04R 9/04; H04R 9/045; H04R 1/028; H04R 7/045; H04R 2209/00; H04R 2201/02; H04R 2400/00; H04R 2499/13; G10K 9/13; B60Q 5/008; B60Q 1/0017; B60Q 5/00; B60R 11/0217; B60R 2001/1276
USPC .................... 381/152, 332, 386, 389; 315/77
See application file for complete search history.

(56) References Cited

U.S. PATENT DOCUMENTS 1,987,396 A * 1/1935 Fullerton ................. B60Q 1/02
116/DIG. 1
2,218,408 A * 10/1940 Meyerhoefer ....... B60Q 1/0017
340/815.69
(Continued)

FOREIGN PATENT DOCUMENTS

JP    2006-180368    7/2006
JP    2007283809 A *    11/2007    ............... B60Q 5/00

*Primary Examiner* — Davetta W Goins
*Assistant Examiner* — Oyesola C Ojo
(74) *Attorney, Agent, or Firm* — Lex IP Meister, PLLC (57) ABSTRACT

The configuration is provided with three flexible arms extending in the same circumferential direction, as a suspension for supporting the magnetic circuit unit in displaceable fashion in the vertical direction with respect to a coil support member. This assures sufficient length of each of the flexible arms, enhancing the vibration characteristics. Next, arm insertion slots having approximately the same vertical Width as the flexible arms are formed at three locations in the circumferential direction in the coil support member. The distal end of each flexible arm is then inserted into the arm insertion slot, doing so in the aforementioned same circumferential direction, causing a barb to engage an engaging part and detain the flexible arm.

18 Claims, 9 Drawing Sheets

(51) Int. Cl.
    *B60Q 1/00*         (2006.01)
    *B60Q 5/00*         (2006.01)
    *H04R 9/02*         (2006.01)
    *G10K 9/13*         (2006.01)
    *H04R 7/04*         (2006.01)

(52) U.S. Cl.
    CPC .............. *H04R 1/028* (2013.01); *H04R 9/025* (2013.01); *H04R 9/04* (2013.01); *H04R 9/045* (2013.01); *H04R 7/045* (2013.01); *H04R 2201/02* (2013.01); *H04R 2209/00* (2013.01); *H04R 2400/00* (2013.01); *H04R 2499/13* (2013.01)

(56) References Cited

U.S. PATENT DOCUMENTS

| | | | | |
|---|---|---|---|---|
| 4,551,849 A | * | 11/1985 | Kasai | B60R 11/0217 381/152 |
| 5,047,747 A | * | 9/1991 | Gottlieb | B60Q 1/0017 340/326 |
| 6,225,956 B1 | * | 5/2001 | Bradley | B60Q 1/2657 340/479 |
| 6,977,584 B2 | * | 12/2005 | Milliken | B60Q 1/22 280/DIG. 14 |
| 2007/0291976 A1 | * | 12/2007 | Kajiwara | H04R 11/02 381/400 |
| 2010/0329486 A1 | * | 12/2010 | Scheel | H04R 7/045 381/152 |

\* cited by examiner

ELECTRODYNAMIC EXCITER AND VEHICLE LAMP EMPLOYING THE SAME

CROSS-REFERENCES TO RELATED APPLICATION

This application is a Continuation application of National Stage application of PCT/JP2012/078661 filed on Nov. 6, 2012, which claims priority to Japanese Patent Application No. 2011-265485 filed on Dec. 5, 2011, the contents of which are incorporated herein by reference.

TECHNICAL FIELD

The present invention relates to an electrodynamic exciter mounted to a vibration panel, and a vehicle lamp employing the same.

BACKGROUND ART

As a conventional speaker of a portable device, a structure adapted to vibrate a touch panel has been known, and an electrodynamic exciter is one of known actuators for driving the speaker.

The exciter includes a coil, a magnetic circuit unit having a magnetic gap for receiving the lower end of the coil, a coil support member arranged on the upper side of the magnetic circuit unit to fixedly support the coil, and a suspension vertically displaceably supporting the magnetic circuit unit with respect to the coil support member. The exciter is mounted to a vibration panel in the upper surface of the coil support member thereof.

Japanese Patent Application Publication No. 2006-180368 discloses an exciter mounted to a vehicle where an interior material thereof is used as the vibration panel.

The suspension of the conventional exciter is provided with a plurality of flexible arms connecting the magnetic circuit unit and the coil support member at a plurality of positions. Each of the flexible arms is extended from the base end thereof on the side of the magnetic circuit unit toward the distal end thereof on the side of the coil support member in the same circumferential direction in a planar view.

DISCLOSURE

Technical Problem

In the exciter disclosed in Japanese Patent Application Publication No. 2006-180368, the flexible arms of the suspension are extended in the same circumferential direction, and therefore, each of the flexible arms can be of sufficient length to set the lowest resonance frequency F0 to a low value, thereby enhancing the vibration characteristics of the exciter.

However, in the conventional exciter, since the distal end of each of the flexible arms is fixed to the coil support member by a screw from below, stress concentration is likely generated at the screwed portion when the magnetic circuit unit vibrates up and down. The support strength for the magnet circuit unit is therefore not sufficiently assured.

The present invention provides an electrodynamic exciter and a vehicle lamp employing the same assuring sufficient support strength with respect to a magnetic circuit unit as well as enhancing vibration characteristics.

SUMMARY

The present invention relates to an improved structure of a coil support member and a suspension to solve the above-stated problems.

An electrodynamic exciter according to the present invention comprises a coil, a magnetic circuit unit having a magnetic gap for receiving the lower end of the coil, a coil support member arranged on the upper side of the magnetic circuit unit to fixedly support the coil, and a suspension vertically displaceably supporting the magnetic circuit unit with respect to the coil support member. The exciter is mounted to a vibration panel in the upper surface of the coil support member thereof. The suspension is provided with a plurality of flexible arms connecting the magnetic circuit unit and the coil support member at a plurality of positions. The plurality of flexible arms are formed extending in the same circumferential direction. Each of the flexible arms is extended from the base end thereof on the side of the magnetic circuit unit toward the distal end thereof on the side of the coil support member in a planar view. A plurality of arm insertion slots, each having almost the same vertical width as each of the flexible arms, are formed at a plurality of circumferential positions of the coil support member. The distal end of each of the flexible arms is inserted into each of the arm insertion slots toward the aforementioned same circumferential direction in which the flexible arms are extended. A separation prevention structure for preventing the distal end of the flexible arm from being separated from the arm insertion slot is provided between at least one of the flexible arms and the arm insertion slot into which the flexible arm is inserted.

Terms indicating directivity such as "lower end" or "upper side" are used to precisely describe a locational relationship between members of the exciter for convenience, and thus the directivity of the exciter in real use is not limited thereto.

The term "flexible arm" implies an arm that can be vertically bent.

The shape of each of the flexible arms is not restrictive as long as they are extended in the same circumferential direction from the base end thereof on the side of the magnetic circuit unit toward the distal end thereof on the side of the coil support member.

The shape of each of the arm insertion slots is not restrictive as long as it has almost the same vertical width as of the flexible arm.

The "separation prevention structure" comprises any structure that can prevent separation of the distal end of each of the flexible arms from each of the arm insertion slots into which the distal end of the each of the flexible arms is inserted in the same circumferential direction, and a detailed configuration of the structure is not restrictive.

A mounting target (i.e., an object provided with a vibration panel to which the exciter is mounted in the upper surface of the coil support member thereof) of the exciter according to the present invention is not restrictive in type or configuration.

Effect of the Invention

As shown in the configuration, in the exciter according to the present invention, the suspension vertically displaceably supporting the magnetic circuit unit with respect to the coil support member is provided with a plurality of flexible arms connecting the magnetic circuit unit and the coil support member at a plurality of positions. Since each of the flexible arms is extended in the same circumferential direction from the base end thereof on the side of the magnetic circuit unit toward the distal end thereof on the side of the coil support member in a planar view, each of the flexible arms can be of sufficient length to set the lowest resonance frequency F0 of the exciter to a low value, thereby enhancing the vibration characteristics thereof.

Further, in the exciter according to the present invention, arm insertion slots, each having almost the same vertical width of each of the flexible arms, are formed at a plurality of circumferential positions in the coil support member. The distal end of each of the flexible arms is inserted into each of the arm insertion slots toward the aforementioned same circumferential direction in which the flexible arms are extended. In addition, a separation prevention structure is provided between at least one of the flexible arms and the arm insertion slot to which the flexible arm is inserted to prevent the distal end of the flexible arm from coming off the arm insertion slot. The following effect is therefore acquired.

Since the distal end of each of the flexible arms is inserted into each of the arm insertion slots toward the aforementioned same circumferential direction in which the flexible arms are extended, each of the flexible arms is vertically held by the coil support member. Such engagement of each of the flexible arms, which is inserted in the substantially perpendicular direction to the vibrating direction of the magnetic circuit coil, with the coil support member allows the vertically displaceable magnetic circuit unit to be supported with a certain circumferential length. Accordingly, stress concentration likely generated in the distal end of each of the flexible arms can be smoothened, thereby assuring sufficient support strength with respect to the magnetic circuit unit.

Since the separation prevention structure is provided between at least one of the flexible arms and the arm insertion slot into which the flexible arm is inserted, unexpected opposite rotation of the suspension during use of the exciter is prevented. Therefore, the distal end of the flexible arm is prevented from coming off the arm insertion slot during use of the exciter.

As described, according to the present invention, the vibration characteristics of the exciter can be enhanced and further the support strength with respect to the magnetic circuit unit can be sufficiently assured.

Further, the present invention provides the following effect.

If the suspension and the coil support member are fastened by a screw at the distal end of each of the flexible arms as done in the conventional art, the screw is likely loosened due to repeated vertical vibration of the magnetic circuit unit, causing the lowest resonance frequency F0 to be varied during use of the exciter. If the suspension and the coil support member are bonded instead of a screw, the adhesive likely drops unexpectedly, or the adhesive likely comes off due to repeated vertical vibration of the magnetic circuit unit, again causing the lowest resonance frequency F0 to be varied.

In the present invention, the connection between the suspension and the coil support member is achieved by the separation prevention structure provided between the distal end of each of the flexible arms and each of the arm insertion slots of the coil support member into which the distal end is inserted. Therefore, the support strength with respect to the magnetic circuit unit is maintained even if the magnetic circuit unit is repeatedly vertically vibrated. Variation in the lowest resonance frequency F0 during use of the exciter is thereby prevented.

Further, since the distal end of each of the flexible arms need not be fixed by a screw or other fastening means to the coil support member in the present invention, the flexible arm is allowed to be deformably bent over the entire length thereof when the magnetic circuit unit vibrates up and down, thus enabling the lowest resonance frequency F0 to be set further lower. If the lowest resonance frequency F0 need not be set further lower, the thickness of each of the flexible arms may be increased and accordingly durability of the suspension can be improved.

As described, since the distal end of each of the flexible arms is not completely fixed to the coil support member, the peak value of the lowest resonance frequency F0 can be lowered and accordingly high damping performance can be realized.

The separation prevention structure is not limited to any particular structure, but if it is constituted by an engagement structure between a distal end of at least one of the flexible arms and an arm insertion slot to which the distal end of the flexible arm is inserted, the distal end of each of the flexible arms can be mechanically connected to the coil support member by only rotating the suspension along with the magnetic circuit unit toward the aforementioned same circumferential direction in which the flexible arms are extended.

If the flexible arms are configured to be provided on the inner side of the coil, the coil can be increased in diameter in a limited space and the magnet of the magnetic circuit unit also can be increased in size, thereby increasing output power of the exciter.

If the flexible arms are configured to be windingly extended in the same circumferential direction, each of the flexible arms can be of sufficient length even if the flexible arms are provided on the inner side of the coil.

The target to which the exciter according to the present invention is mounted is not limited, but if the exciter is mounted to a vehicle lamp at the front or rear of a vehicle, the following effect can be acquired.

In a hybrid or electric vehicle, which has been recently developed, driving noise such as engine noise is decreased by use of an electric motor, and therefore a person such as a pedestrian is hardly notified of an approaching vehicle If the exciter is configured to be mounted to a vehicle lamp attached to the front side of the vehicle, a person is easily notified of an approaching vehicle by a sound generated from the vehicle lamp by driving the exciter mounted thereto. If the exciter is configured to be mounted to a vehicle lamp provided at the rear side of the vehicle, the same effect is obtained. Further, compared to such a case as the exciter is mounted to a bumper, the vibration panel can be made of high hardness material, and accordingly the vibration characteristics of the exciter can be enhanced.

Generally, in a vehicle lamp, a translucent cover is mounted to a front end opening of a lamp body. If the translucent cover is configured to constitute the vibration panel, the vibration panel can be made of high hardness material, and accordingly the vibration characteristics of the exciter can be enhanced.

DESCRIPTION OF THE DRAWINGS

FIG. 1 (*a*) is a top perspective view of an electrodynamic exciter according to an embodiment of the present invention.

FIG. 1 (*b*) is a bottom perspective view of the exciter according to an embodiment of the present invention.

FIG. 6 (a) to (c) show how the distal end of each of the flexible arms is inserted into each of the arm insertion slots in the extending direction of the flexible arms resulting in the engagement as shown in FIG. 5.

FIG. 8 (a) is the first variation of the exciter according to the embodiment shown in FIG. 5.

FIG. 8 (b) is the second variation of the exciter according to the embodiment shown in FIG. 5.

FIG. 9 (a) is the third variation of the exciter according to the embodiment shown in FIG. 6.

FIG. 9 (b) is the fourth variation of the exciter according to the embodiment shown in FIG. 6.

FIG. 9 (c) is the fifth variation of the exciter according to the embodiment shown in FIG. 6.

FIG. 9 (d) is the sixth variation of the exciter according to the embodiment shown in FIG. 6.

MODE FOR INVENTION

Hereinafter, embodiments of the present invention will be explained with reference to drawings.

Figure 1:
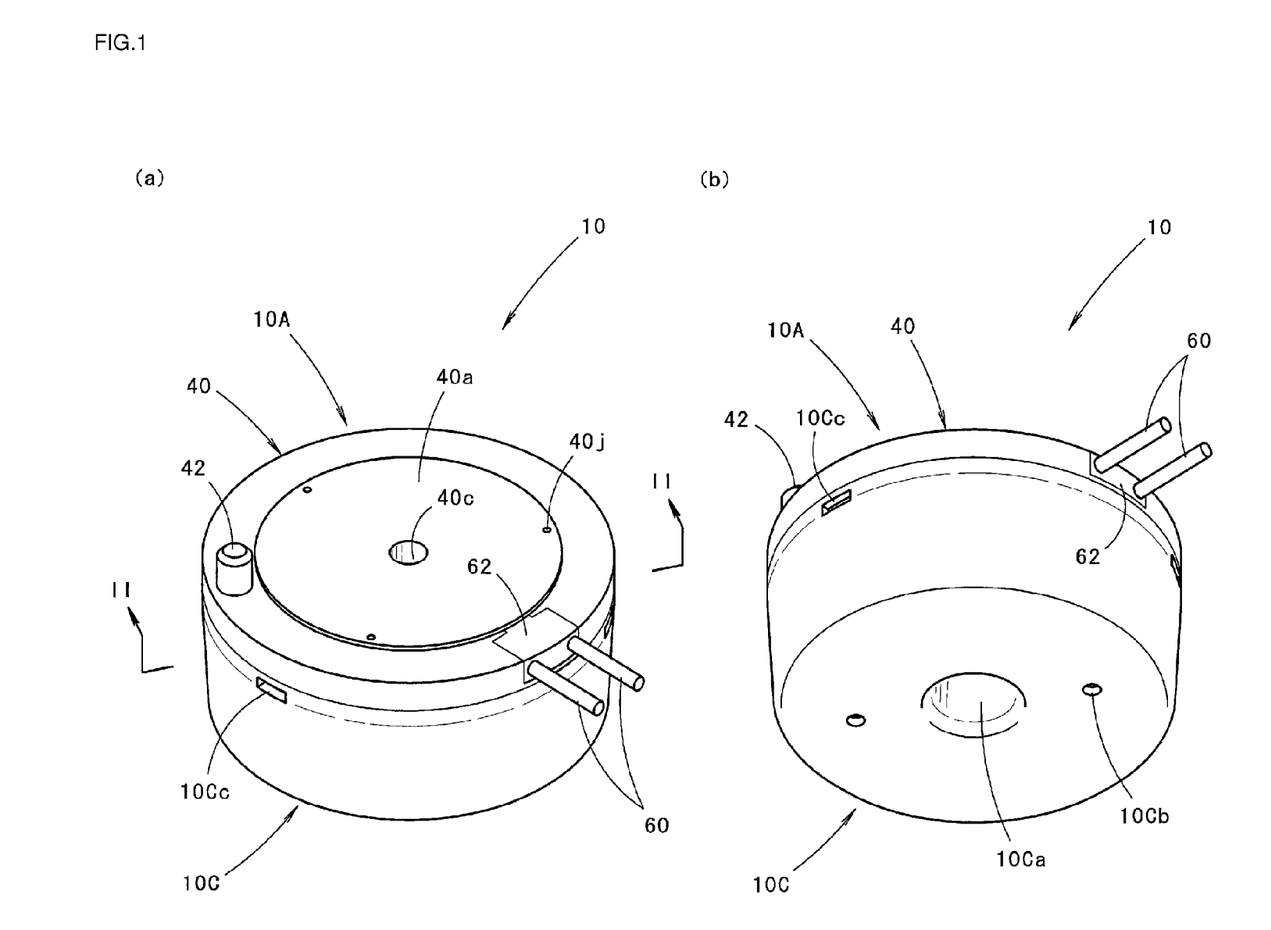
Figure 2:
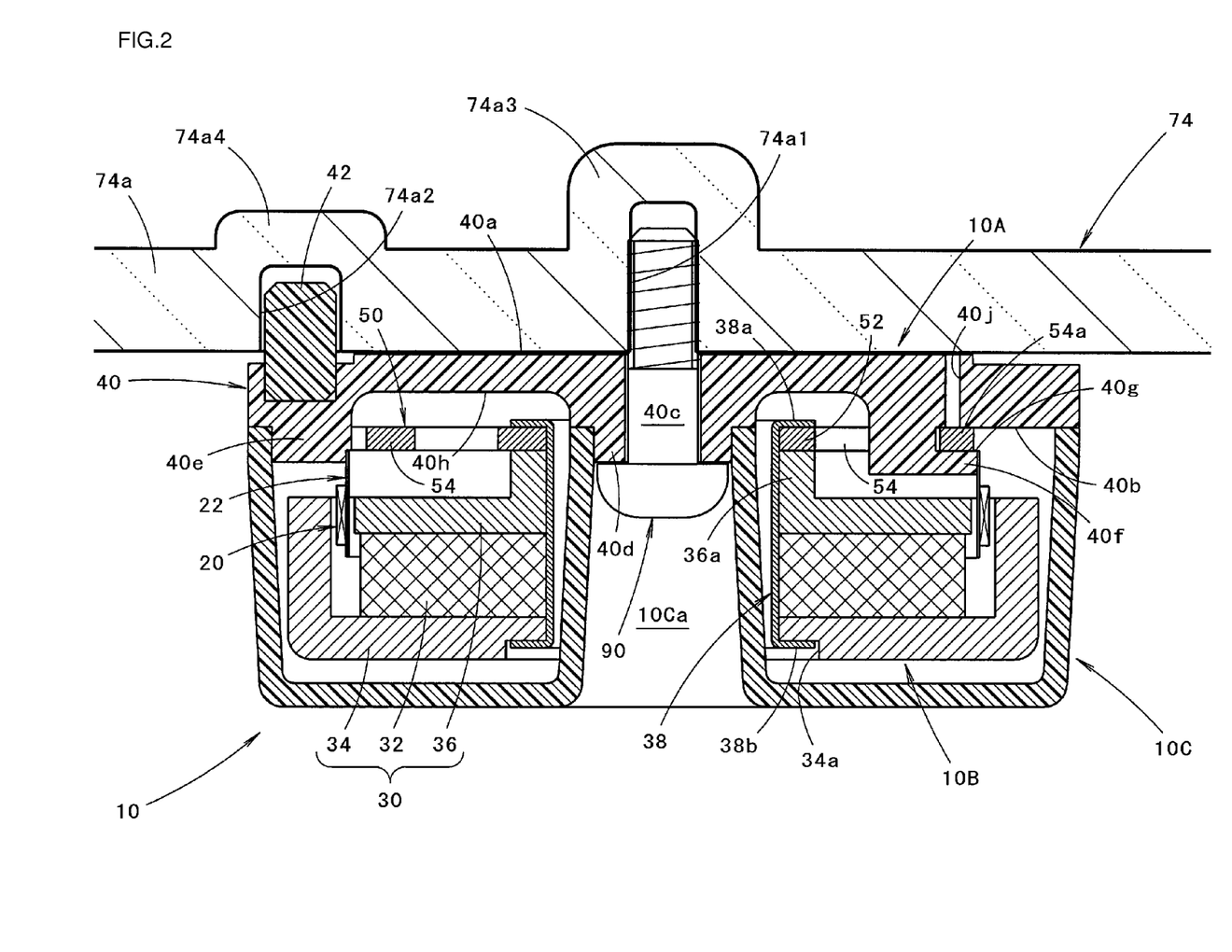
FIG. 2 is a cross-sectional view of the dotted portion II of FIG. 7 taken along the line II-II of FIG. 1 (*a*).
Figure 7:
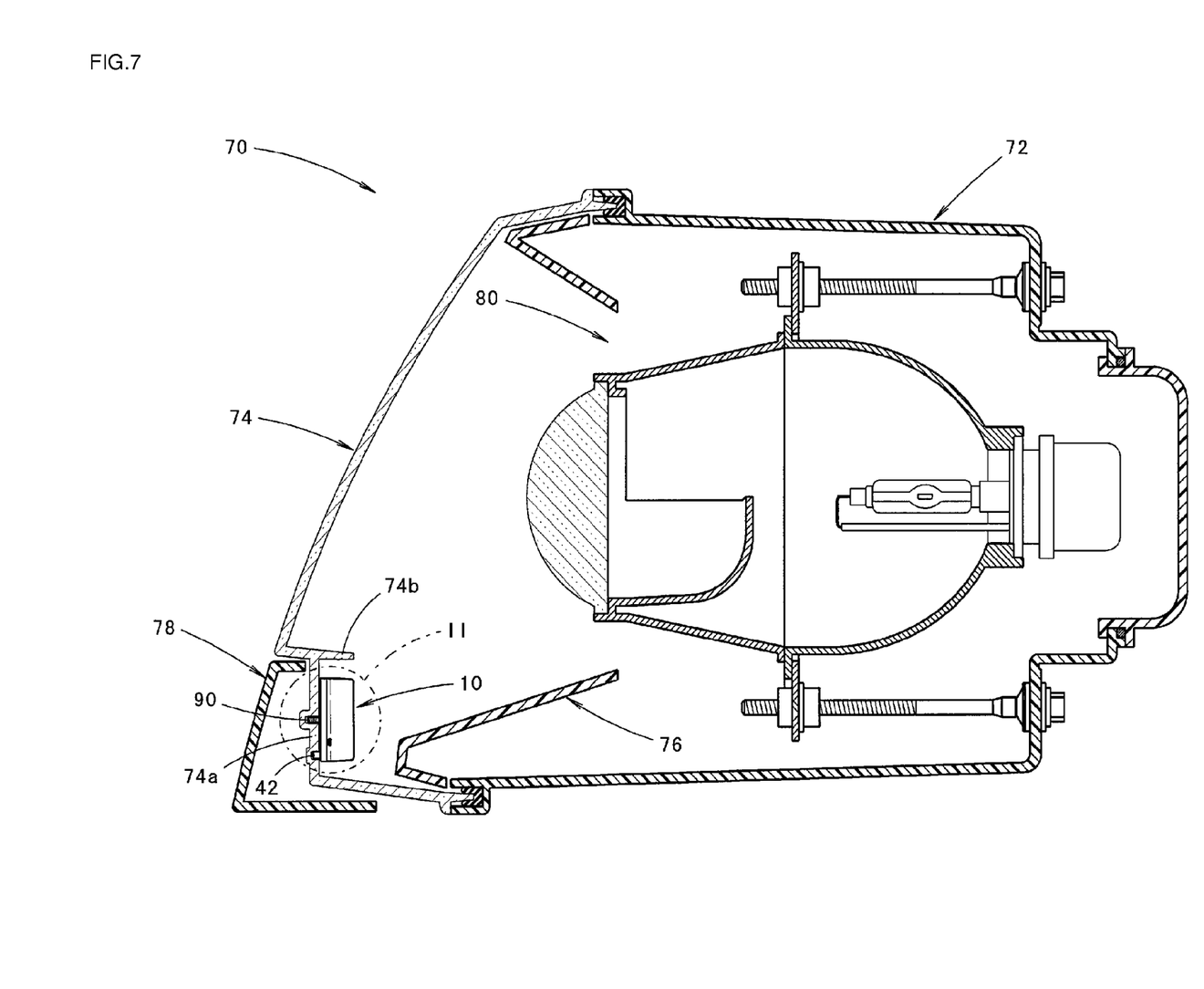
FIG. 7 is a side cross-sectional view of a vehicle lamp where the exciter is mounted.

FIG. 1 (a) is a top perspective top view of an electrodynamic exciter according to an embodiment of the present invention, FIG. 1 (b) is a bottom perspective view thereof, and FIG. 2 is a cross-sectional view of the dotted portion II of FIG. 7 taken along the line II-II of FIG. 1 (a).

As shown in FIG. 2, an electrodynamic exciter 10 according to the present embodiment includes a coil 20, a magnetic circuit unit 30 having a magnetic gap for receiving a lower end of the coil 20, a coil support member 40 arranged on the upper side of the coil 20 and the magnetic circuit unit 30 to fixedly support the coil 20, and a suspension 50 vertically displaceably supporting the magnetic circuit unit 30 with respect to the coil support member 40.

The exciter 10 may be used with the upper surface 40a of the coil support member 40 thereof being mounted to a translucent cover 74 (described later) constituting a vibration panel. When the coil 20 is energized, the magnetic circuit unit 30 vibrates up and down and thus the translucent cover 74 also vibrates due to a vibration reaction of the magnetic circuit unit 30.

The exciter 10 comprises an upper unit 10A, a lower unit 10B mounted to the upper unit 10A, and a cover member 10C mounted to the upper unit 10A in a manner to cover the lower unit 10B from below.

Figure 3:
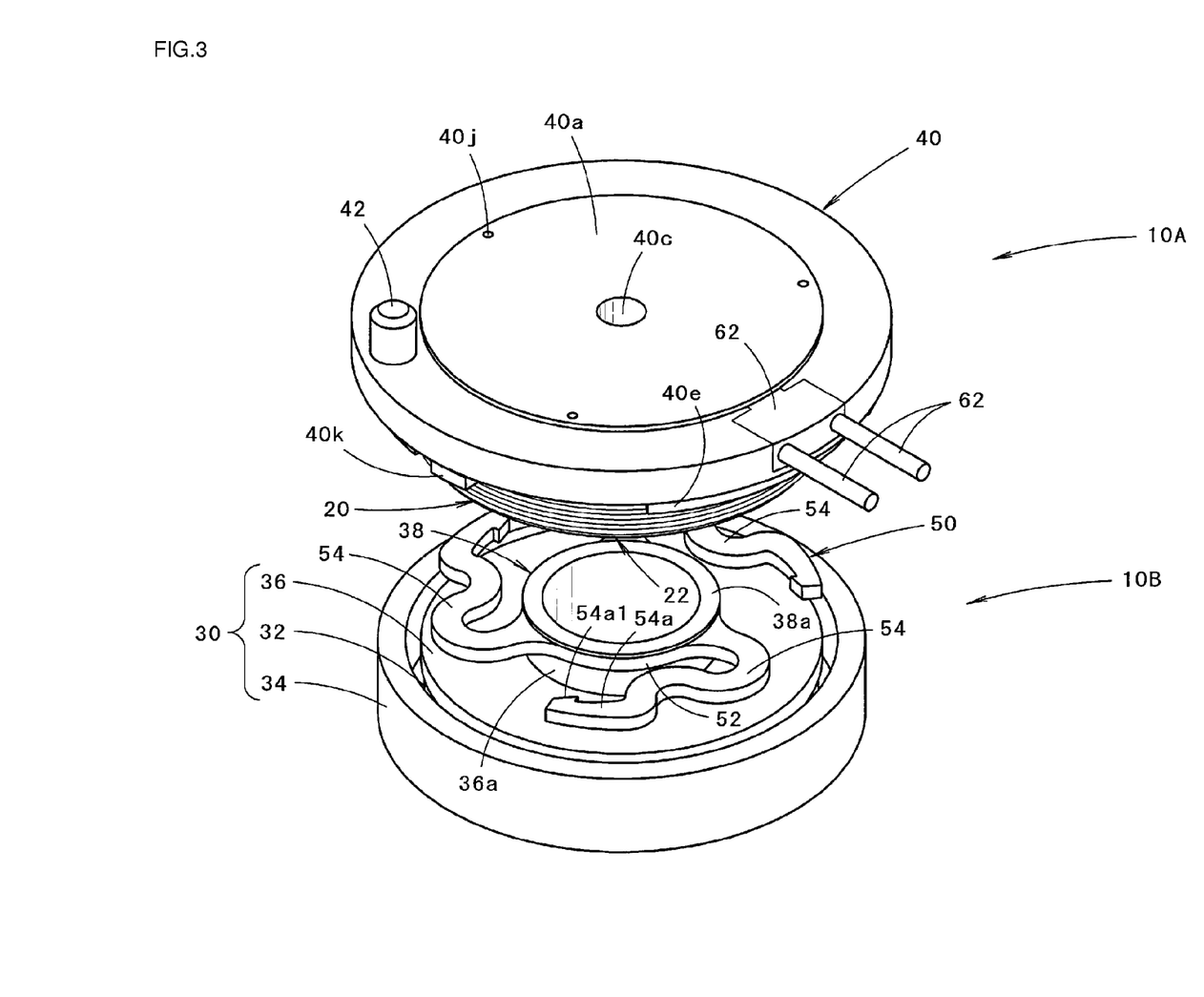
FIG. 3 is an exploded top perspective view of the exciter with a cover member thereof is removed, showing an upper unit and a lower unit thereof.
Figure 4:
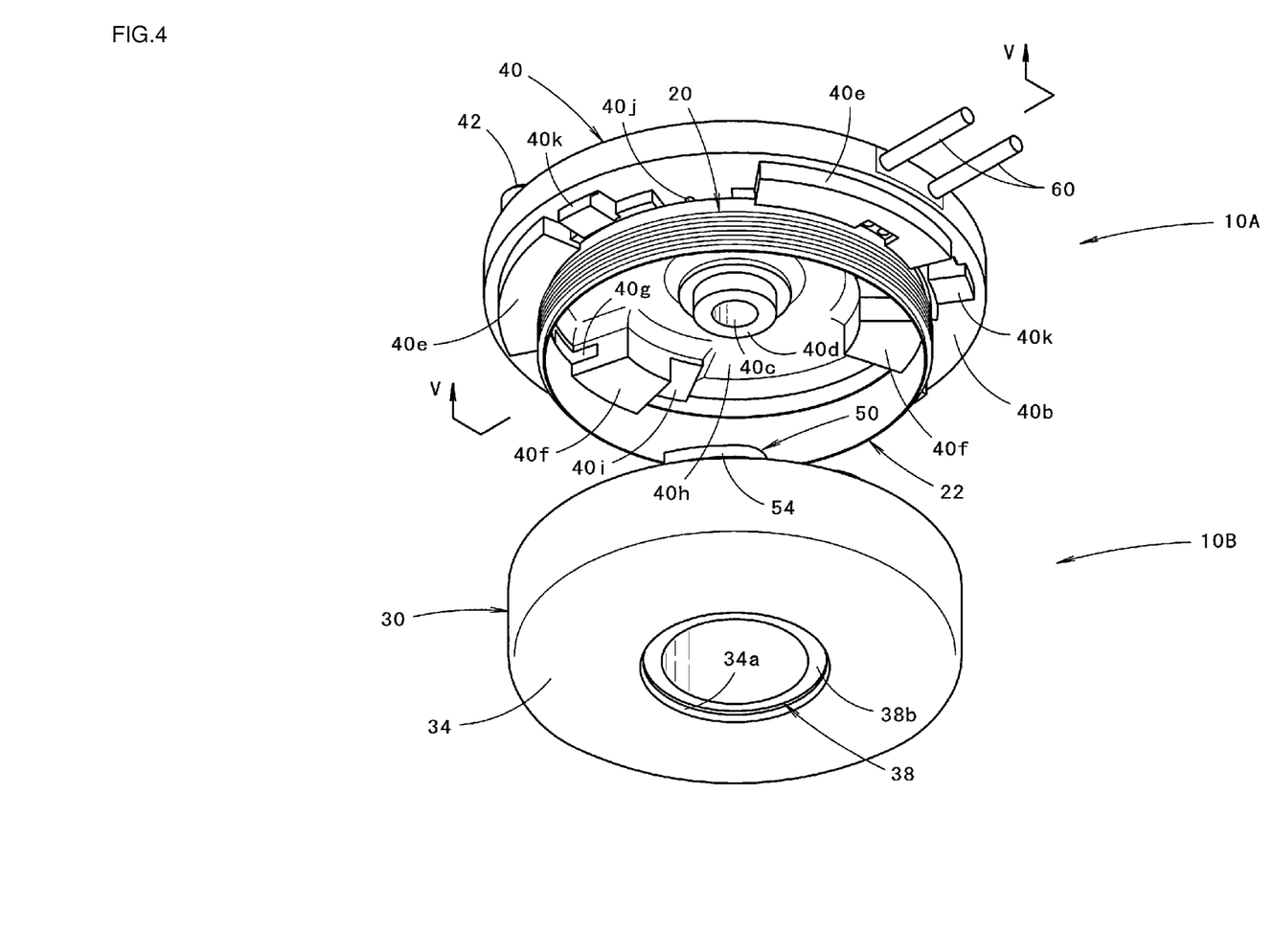
FIG. 4 is an exploded bottom perspective view of the exciter with a cover member thereof is removed, showing an upper unit and a lower unit thereof.
Figure 5:
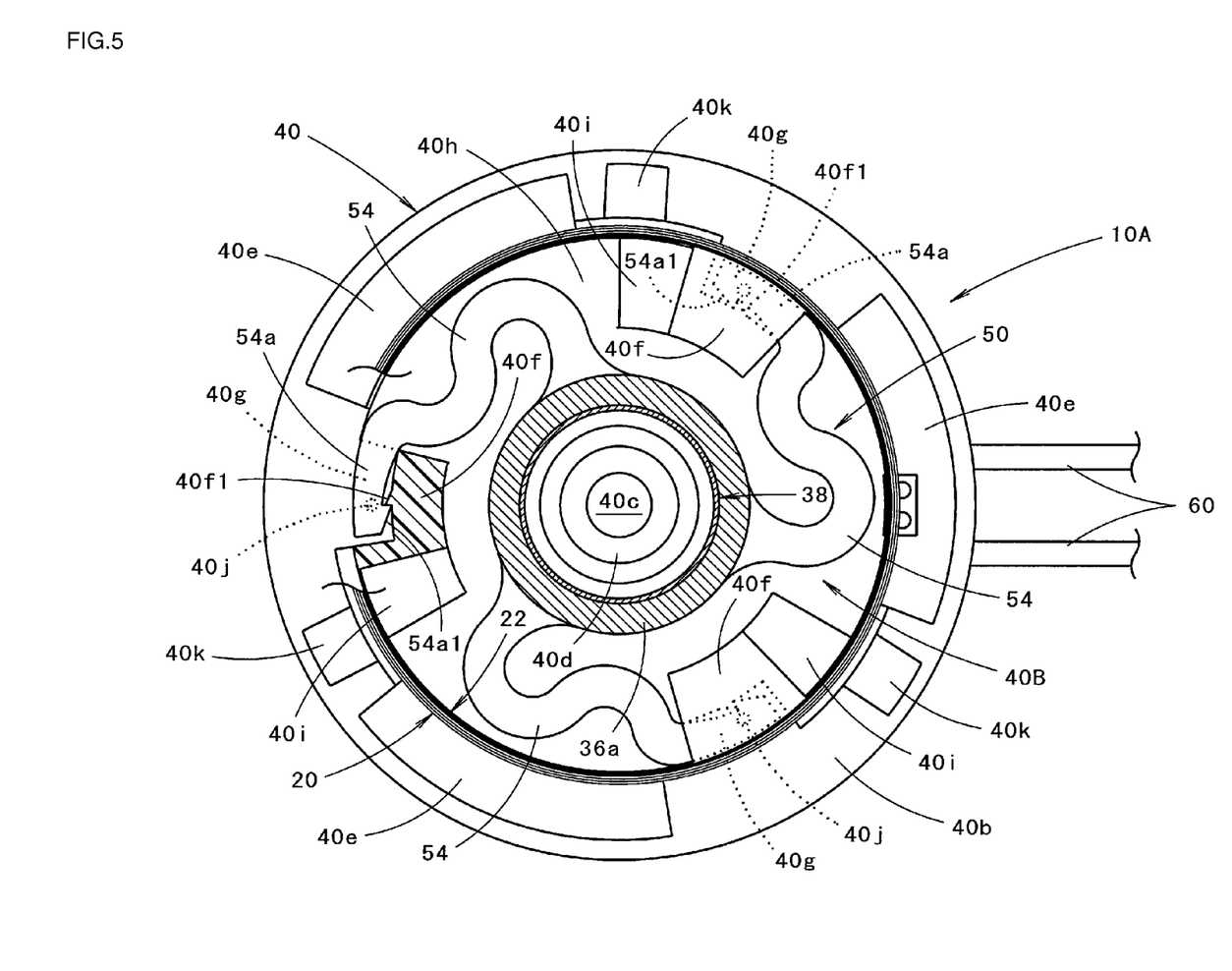
FIG. 5 is a bottom cross-sectional view of a main part of the exciter, taken along the line V-V of FIG. 4.

FIG. 3 is an exploded top perspective view of the exciter 10 with the cover member 10C thereof is removed, showing the upper unit 10A and the lower unit 10B thereof. FIG. 4 is an exploded bottom perspective view of the exciter 10 with the cover member 10C thereof is removed, showing the upper unit 10A and the lower unit 10B thereof. FIG. 5 is a bottom cross-sectional view of a main part of the exciter 10, taken along the line V-V of FIG. 4.

As shown in the drawings, the coil support member 40 is a resin molding formed in the shape of a substantially circular plate having the exterior diameter of about 30 mm to 40 mm (e.g., about 35 mm). A cylindrical through-hole 40c vertically penetrating the coil support member 40 from top to bottom is formed in the center of the coil support member 40.

The upper surface 40a of the coil support member 40 is substantially flat, but a ring-shaped area at the circumference of the upper surface 40a is stepped to be slightly lower than the inner area. A positioning pin 42 protruding upward is fixedly buried in the ring-shaped area of the upper surface 40a.

A bottom surface 40b of the coil support member 40 is provided with a plurality of protrusions.

A boss portion 40d protruding downward is formed in the center of the bottom surface 40b in a manner to surround the through-hole 40c. A plurality of first protrusions 40e are respectively formed at three positions spaced at equal intervals along the circumferential direction near the edge of the bottom surface 40b. A plurality of second protrusions 40f are respectively formed at three positions spaced at equal intervals along the circumferential direction on the inner side of the first protrusions 40e in a manner not to be aligned to the first protrusions 40e in the circumferential direction. The inner area of the bottom surface 40b on the inner side of the first protrusions 40e, excluding the portion where the second protrusions 40f are formed, constitutes a ring-shaped recess portion 40h surrounding the boss portion 40d.

The coil 20 is fixed with respect to the coil support member 40 by use of a bobbin 22. The coil 20 is spirally wound to the exterior surface of the bobbin 22 formed in the shape of a cylinder having the smaller diameter than the exterior diameter of the coil support member 40. The bobbin 20 is fixed to the coil support member 40 by adhesive and the like in a manner that the upper end of the bobbin 22 is caught between the first protrusions 40e and the second protrusions 40f.

A pair of coil terminals (not shown) are extended to the outer side of the coil 20 and then connected to a pair of wiring cords 60 through a connection portion 62 arranged in the coil support member 40. The connection portion 62 is arranged in a manner to fill a recess formed in the ring-shaped area of the upper surface 40a of the coil support member 40 so that the connection portion 62 is substantially coplanar with the ring-shaped area.

The coil 20, the bobbin 22, the coil support member 40, the positioning pin 42, and the pair of wiring cords 60 are integrally formed into the upper unit 10A.

The magnetic circuit unit 30 is an inner-magnet type magnetic circuit unit having a magnet 32 disposed on the inner side of the coil 20. A magnetic gap is formed by a substantially U-shaped base 34 in cross section fixed to the bottom surface of the magnet 32 and a flat-plate yoke 36 fixed to the top surface thereof.

The magnet 32, the base 34, and the yoke 36 respectively has an opening of which diameter is greater than the boss portion 40d of the coil support member 40. A ring-shaped protrusion 36a protruding upward is formed on the inner edge of the upper surface of the yoke 36. A ring-shaped stepped portion 34a is formed on the inner edge of the bottom surface of the base 34. The magnetic circuit unit 30 is caulked by a cylindrical rivet 38 having an upper flange 38a and a lower flange 38b with the suspension 50 placed on the upper surface of the ring-shaped protrusion 36a of the yoke 36. The upper flange 38a of the rivet 38 is engaged with the suspension 50 and the lower flange 38b is engaged with the ring-shaped stepped portion 34a of the base 34.

The magnetic circuit unit 30, the rivet 38, and the suspension 50 are integrally formed into the lower unit 10B.

The cover member 10C having a U-shaped cross-section is extended in the shape of a ring with a substantially cylindrical opening 10Ca formed in the center thereof. The cover member 10C is fixed to the coil support member 40 with the upper end of each of the inner and outer edges thereof respectively engaged with the bottom surface 40b of the coil support member 40 in a manner that the upper end of the inner edge thereof is engaged with the outer surface of the boss portion 40d and the upper end of the outer edge thereof is engaged with the outer surface of each of the first protrusions 40e at the three positions.

The cover member 10C is provided with three engaging openings 10Cc (refer to FIG. 1) formed in the upper end of the outer surface thereof. The coil support member 40 is provided with three engaging protrusions 40k formed near the outer edge of the bottom surface 40b thereof. The three engaging openings 10Cc are positioned at equal intervals along the circumferential direction while the three engaging protrusions 40k are respectively placed adjacent to the first protrusions 40e along the circumferential direction. The cover member 10C is fixed to the coil support member 40 by bringing the three engaging protrusions 40k into engagement with the three engaging openings 10Cc.

The cover member 10C is also provided with two vent holes 10Cb formed along the circumferential direction in the bottom surface thereof.

The suspension 50 is formed in the shape of a leaf spring by punching a metal plate (e.g., stainless steel) having the thickness of 0.5 to 1.5 mm (e.g., 1 mm). The suspension 50 consists of a ring-shaped center portion 52 and three flexible arms 54 extended from the center portion 52. Each of the flexible arms 54 is positioned immediately under the ring-shaped recess portion 40h of the coil support member 40 within the inner space of the coil 20 with the center portion 52 placed on the upper surface of the ring-shaped protrusion 36a of the yoke 36.

The three flexible arms 54 are equally distanced from each other along the circumferential direction. Each of the flexible arms 54 is extended along the same circumferential direction (the counterclockwise direction in FIG. 5) from the base end thereof (i.e., the center portion 52) on the side of the magnetic circuit unit 30 toward the distal end 54a thereof on the side of the coil support member 40.

Each of the flexible arms 54 is windingly extended along the aforementioned same circumferential direction in the same plane, and the distal end 54a of each of the flexible arms 54 is tapered in the circumferential direction.

Each of the flexible arms 54 has a wedge-shaped locking portion 54a1 formed on the inner edge of the distal end 54a thereof. That is, the distal end 54a of each of the flexible arms 54 constitutes an engaging portion having the locking portion 54a1, which is obliquely protruded inward in the direction opposite to the direction in which the flexible arm 54 are extended.

The coil support member 40 has three arm insertion slots 40g formed in three positions in the circumferential direction, each having almost the same vertical width as each of the flexible arms 54 (in detail, the vertical width slightly greater than the plate thickness of the suspension 50). Each of the arm insertion slots 40g is formed in each of the second protrusions 40f of the coil support member 40 in a manner to open toward the direction opposite to the direction in which the flexible arm 54 are extended. Each of the distal ends 54a of the flexible arms 54 is configured to be inserted into each of the arm insertion slots 40 toward the direction in which the flexible arms 54 are extended.

The upper surface of each of the arm insertion slots 40 is constituted by the bottom surface 40b of the coil support member 40 while the bottom and the inner surface thereof by the second protrusions 40f. The outer side of each of the arm insertion slots is opened.

In the present embodiment, a separation prevention structure is provided between each of the flexible arms 54 and each of the arm insertion slots 40g in a manner to prevent the distal end 54a of the flexible arm 54 from coming off the arm insertion slot 40g due to an unexpected rotation of the flexible arm 54 in the direction opposite to the direction in which the flexible arm 54 are extended.

A wedge-shaped engaging portion 40f1 is formed in each of the second protrusions 40f of the coil support member 40 constituting the inner surface of each of the arm insertion slots 40g. The engaging portion 40f1 is obliquely protruded outward in the direction in which the flexible arms 54 are extended. Therefore, when the distal end 54a of each of the flexible arms 54 is inserted into each of the arm insertion slots 40g in the direction in which the flexible arms 54 are extended, the locking portion 54a1 of the flexible arm 54 is brought into engagement with the engaging portion 40f1 of the arm insertion slot 40g.

As described, in the present embodiment, the separation prevention structure may be realized by an engagement structure in which the locking portion 54a1 of each of the flexible arms 54 is brought into engagement with the engaging portion 40f1 of each of the arm insertion slots 40g. The lower unit 10B is thereby mounted to the upper unit 10A.

Figure 6:
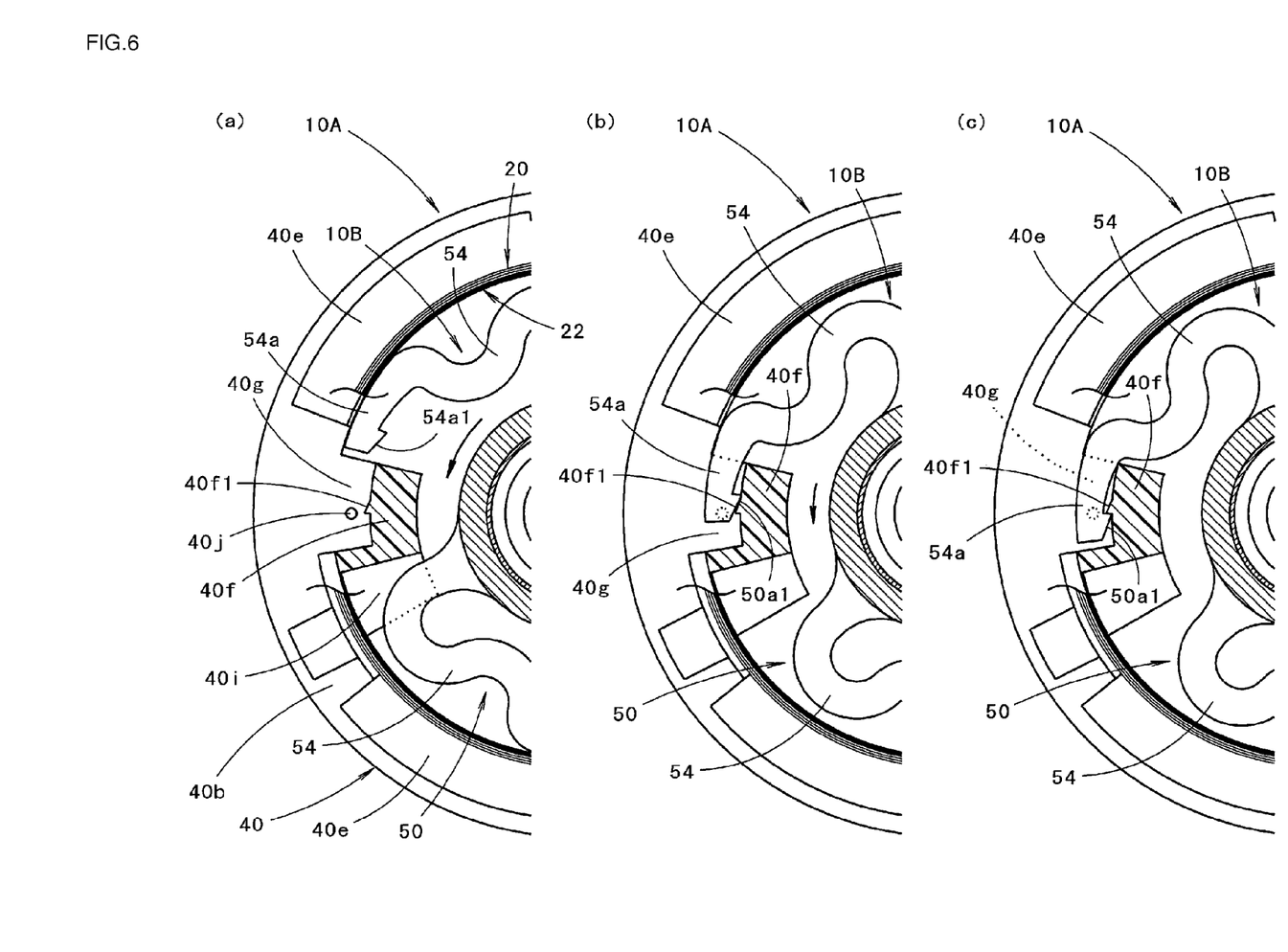

FIG. 6 (a) to (c) show how the distal end 54a of each of the flexible arms 54 is inserted into each of the arm insertion slots 40g in the direction in which the flexible arms 54 are extended, resulting in the engagement as shown in FIG. 5.

First, as shown in FIG. 6 (a), the lower unit 10B is set against the upper unit 10A from below in a manner that each of the flexible arms 54 is somewhat spaced from each of the second protrusions 40f toward the opposite direction to the extending direction of the flexible arms 54.

In order to smoothly insert the distal end 54a of each of the flexible arms 54 into each of the arm insertion slots 40g, the upper surface of the flexible arm 54 need to be substantially coplanar with the bottom surface 40b of the coil support member 40 when the lower unit 10B is set. For this purpose, an arm placement portion 40i is provided adjacent to each of the second protrusions 40f in the extending direction of the flexible arm 54 in a manner to be in the substantially same plane as the bottom surface 40b of the coil support member 40. By positioning each of the flexible arms 54 on each of the arm placement portions 40i, the upper surface of each of the flexible arms 54 is set substantially coplanar with the bottom surface 40b of the coil support member 40.

Next, as shown in FIG. 6 (b), the lower unit 10B is rotated against the upper unit 10A in the circumferential direction in which the flexible arms are extended to insert the distal end 54a of each of the flexible arms 54 into each of the arm insertion slots 40g. As the lower unit 10B is rotated, the locking portion 54a1 formed in the distal end 54a of each of the flexible arms 54 is brought over the engaging portion 40f1 formed in each of the second protrusions 40f. During the rotation, the flexible arm 54 is likely bent so that the distal end 54a thereof is displaced toward the outer side. Since the outer side of each of the arm insertion slots 40g is opened, interference of the displaced distal end 54a with the coil support member 40 is prevented.

As the lower unit 10B is further rotated against the upper unit 10A, as shown in FIG. 6 (c), the locking portion 54a1 of the distal end 54a of each of the flexible arms 54 is brought into engagement with the engaging portion 40f1 of each of the second protrusions 40f. As a result, the inner surface of the distal end 54a of each of the flexible arms 54 is engaged with each of the second protrusions 40f at the opened position of each of the arm insertion slots 40g. Thus, the distal end 54a of each of the flexible arms 54 is mechanically connected to the coil support member 40, thereby securely preventing separation thereof.

As shown in FIG. 1 (a) and FIG. 6 (a), a small-diameter adhesive injection hole 40j vertically penetrating the coil support member 40 from the upper surface 40a to the bottom surface 40b thereof is formed in a location where each of the arm insertion slots 40g is formed. After the lower unit 10B is assembled to the upper unit 10A, an adhesive may be injected from above to each of the adhesive injection holes 40j so that the distal end 54a of each of the flexible arms 54 inserted into each of the arm insertion slots 40g is bonded to the coil support member 40, thereby further securely preventing separation of the flexible arms 54.

FIG. 7 is a side cross-sectional view of a vehicle lamp 70 where the exciter 10 according to the present embodiment is mounted.

As shown in FIG. 7, the vehicle lamp 70 is a headlamp mounted to the front of a motor vehicle, comprising a lamp body 72, a translucent cover 74 attached to the opened front of the lamp body 72, and a lighting unit 80 accommodated in a lighting chamber constituted by the lamp body 72 and the translucent cover 74. An extension panel 76 is arranged closely behind the translucent cover 74 in a manner to surround the lighting unit 80.

The translucent cover 74 is made of a hard resin such as a polycarbonate resin and the like.

The translucent cover 74 is extended along the shape of the vehicle body except the lower section thereof stepped back toward the rear. The lower section of the translucent cover 74 has a substantially vertically extending surface constituting an exciter mounting portion 74a for mounting the exciter 10. A molding 78 extended in the width direction of the vehicle is arranged ahead of the exciter mounting portion 74a in a manner to be coplanar with the other section of the translucent cover 74.

The exciter 10 is mounted on the exciter mounting portion 74a of the translucent cover 74 from the rear. A flange portion 74b provided at the upper end of the exciter mounting portion 74a extends in the substantially horizontal direction toward the rear, and therefore, the exciter 10 is not allowed to be directly viewed through the other section of the translucent cover 74.

FIG. 2 is a cross-sectional view of the dotted portion II of FIG. 7 taken along the line II-II of FIG. 1 (a).

In FIG. 2, in the translucent cover 74 constituting the vibration panel, the exciter mounting portion 74a is horizontally extended. The exciter 10 is fixed to the exciter mounting portion 74a by a screw with the upper surface 40a of the coil support member 40 pressed against the bottom surface of the exciter mounting portion 74a (i.e., against the rear surface of the exciter mounting portion 74a in the vehicle lamp 70 in FIG. 7).

A screw hole 74a1 for receiving the screw is formed in the exciter mounting portion 74a of the translucent cover 74. Further, a pin receiving hole 74a2 for receiving the positioning pin 42 of the coil support member 40 is formed at a location distanced from the screw hole 74a1 in the exciter mounting portion 74.

With the positioning pin 42 of the exciter 10 inserted into the pin receiving hole 74a2, the through-hole 40c of the coil support member 40 is brought into alignment with the screw hole 74a1 of the exciter mounting portion 74a, and then a screw 90 is inserted into the through-hole 40c of the coil support member 40 through the cylindrical opening 10Ca of the cover member 10C. The screw 90 is further inserted into the screw hole 74a1 of the exciter mounting portion 74a until the head of the screw 90 comes into contact with the boss portion 40d of the coil support member 40. The exciter 10 is thereby fixed to the exciter mounting portion 74a of the translucent cover 74. Engagement of the positioning pin 42 with the pin receiving hole 74a2 prevents unexpected rotation of the exciter 10 during screwing.

Further, raised portions 74a3 and 74a4 are respectively formed in the exciter mounting portion 74a to prevent the screw hole 74a1 and the pin receiving hole 74a2 from penetrating the exciter mounting portion 74a.

Hereinafter, the effect of the present embodiment will be described.

In the exciter 10 according to the present embodiment, the suspension 50 vertically displaceably supporting the magnetic circuit unit 30 with respect to the coil support member 40 is provided with the three flexible arms 54 connecting the magnetic circuit unit 30 and the coil support member 40 at three positions. Since each of the flexible arms 54 is extended in the same circumferential direction from the base end thereof on the side of the magnetic circuit unit 30 toward the distal end 54a thereof on the side of the coil support member 40 in a plane view, each of the flexible arms 54 can be of sufficient length to set the lowest resonance frequency F0 of the exciter 10 to a low value, thereby enhancing the vibration characteristics thereof.

Further, in the exciter 10 according to the present embodiment, the arm insertion slots 40g, each having almost the same vertical width as each of the flexible arms 54, are formed at three circumferential positions in the coil support member 40. The distal end 54a of each of the flexible arms 54 is inserted into each of the arm insertion slots 40g toward the aforementioned same circumferential direction in which the flexible arms are extended. In addition, the separation prevention structure is provided between each of the flexible arms 54 and each of the arm insertion slots 40 to prevent the distal end 54a of the flexible arm 54 from coming off the arm insertion slot. 40g. The following effect is therefore acquired.

Since the distal end 54a of each of the flexible arms 54 is inserted into each of the arm insertion slots 40g toward the aforementioned same circumferential direction in which the flexible arms are extended, each of the flexible arms 54 is vertically held by the coil support member 40. Such engagement of each of the flexible arms 54, which is inserted in the substantially perpendicular direction to the vibrating direction of the magnetic circuit coil 30, with the coil support member 40 allows the vertically displaceable magnetic circuit unit 30 to be supported with a certain circumferential length. Accordingly, stress concentration likely generated in the distal end 54a of each of the flexible arms 54 can be smoothened, thereby assuring sufficient support strength with respect to the magnetic circuit unit 30.

Since the separation prevention structure is provided between each of the flexible arms 54 and each of the arm insertion slots 40g, unexpected opposite rotation of the suspension 50 is prevented during use of the exciter 10. Therefore, the distal end 54a of the flexible arm 54 is prevented from coming off the arm insertion slot 40g during use of the exciter 10.

According to such an embodiment, the vibration characteristics of the exciter 10 is enhanced and further the support strength with respect to the magnetic circuit unit 30 is sufficiently assured.

Further, in the present embodiment, the connection between the suspension 50 and the coil support member 40 is achieved by the separation prevention structure provided between the distal end 54a of each of the flexible arms 54 and each of the arm insertion slots 40g of the coil support member 40 into which the distal end 54a is inserted. Therefore, the support strength with respect to the magnetic circuit unit 30 is maintained even if the magnetic circuit unit 30 is repeatedly vertically vibrated. Variation in the lowest resonance frequency F0 during use of the exciter 10 is thereby prevented.

Further, in the present embodiment, since the distal end 54a of each of the flexible arms 54 is not firmly fixed to the coil support member 40, the flexible arm 54 is allowed to be deformably bent over the entire length thereof when the magnetic circuit unit 30 vibrates up and down, thus enabling the lowest resonance frequency F0 to be set further lower. If the lowest resonance frequency F0 need not be set further lower, the thickness of each of the flexible arms 54 may be increased and accordingly durability of the suspension 50 can be improved.

As described, since the distal end 54a of each of the flexible arms 54 is not completely fixed to the coil support member 40, the peak value of the lowest resonance frequency F0 can be lowered and accordingly high damping performance can be realized.

In the present embodiment, since the distal end 54a of each of the three flexible arms 54 is engaged with each of the three arm insertion slots 40g of the coil support member 40, engagement is easily maintained at any of the three positions during operation of the exciter 10. Thus, even if a component is of lower accuracy, disengagement thereof can be surely prevented.

In the present embodiment, the separation prevention structure comprises the engagement structure between the wedge-shaped locking portion 54a1 formed in the distal end 54a of each of the flexible arms 54 and the wedge-shaped engaging portion 40f1 formed in each of the arm insertion slots 40g. Therefore, the distal end 54a of each of the flexible arms 54 can be mechanically connected to the coil support member 40 by only rotating the suspension 50 along with the magnetic circuit unit 30 toward the aforementioned same circumferential direction in which the flexible arms 54 are extended.

In addition, in the exciter 10 according to the present embodiment, since the flexible arms 54 are provided on the inner side of the coil 20, the coil 20 can be increased in diameter in a limited space and the magnet 32 of the magnetic circuit unit 30 also can be increased in size, thereby increasing output power of the exciter 10.

Since the respective flexible arms 54 are windingly extended in the same circumferential direction, each of the flexible arms 54 can be of sufficient length even if the flexible arms 54 are provided on the inner side of the coil 20.

The exciter 10 according to the present embodiment is mounted to the vehicle lamp 70 attached to the front of the vehicle such as a hybrid or electric vehicle whose driving noise such as an engine noise is decreased by use of an electric motor. Thus, it is easy to notify a person such as a pedestrian of an approaching vehicle by a sound generated from the vehicle lamp 70 where the exciter 10 is mounted. Further, compared to such a case as the exciter 10 is mounted to a bumper and the like, the vibration panel can be made of harder material, thereby enhancing the vibration characteristics of the exciter 10.

In the vehicle lamp 70 according to the present embodiment, the translucent cover 74 mounted to the front end opening of the lamp body 72 constitutes the vibration panel. Therefore the vibration panel can be made of high hardness material, and accordingly the vibration characteristics of the exciter 10 is sufficiently enhanced.

Further, since the exciter 10 is mostly mechanically assembled with use of minimum amount of adhesive, the translucent cover 74 is effectively prevented from being fogged with gas likely generated from the adhesive due to a temperature increase in the lighting chamber during use of the lighting unit 80.

In the present embodiment, the suspension 50 is provided with the three flexible arms 54, but two or four or more flexible arms may be provided.

In the present embodiment, the separation prevention structure is realized by the engagement structure between the wedge-shaped locking portion 54a1 formed in the distal end 54a of the flexible arm 54 and the wedge-shaped engaging portion 40f1 formed in the arm insertion slot 40g. However, another engagement structure is also applicable and a separation prevention structure by a screw or bonding may be also used instead of the above-described engagement structure.

In the present embodiment, the translucent cover 74 of the vehicle lamp 70 attached to the front of the vehicle constitutes the vibration panel of the exciter 10, but the same effect is obtained even if the translucent cover 74 of the vehicle lamp 70 attached to the rear of the vehicle constitutes the vibration panel.

Hereinafter, a variation of the embodiment of the present invention will be described.

The first variation of the embodiment of the present invention will now be described.

Figure 8:
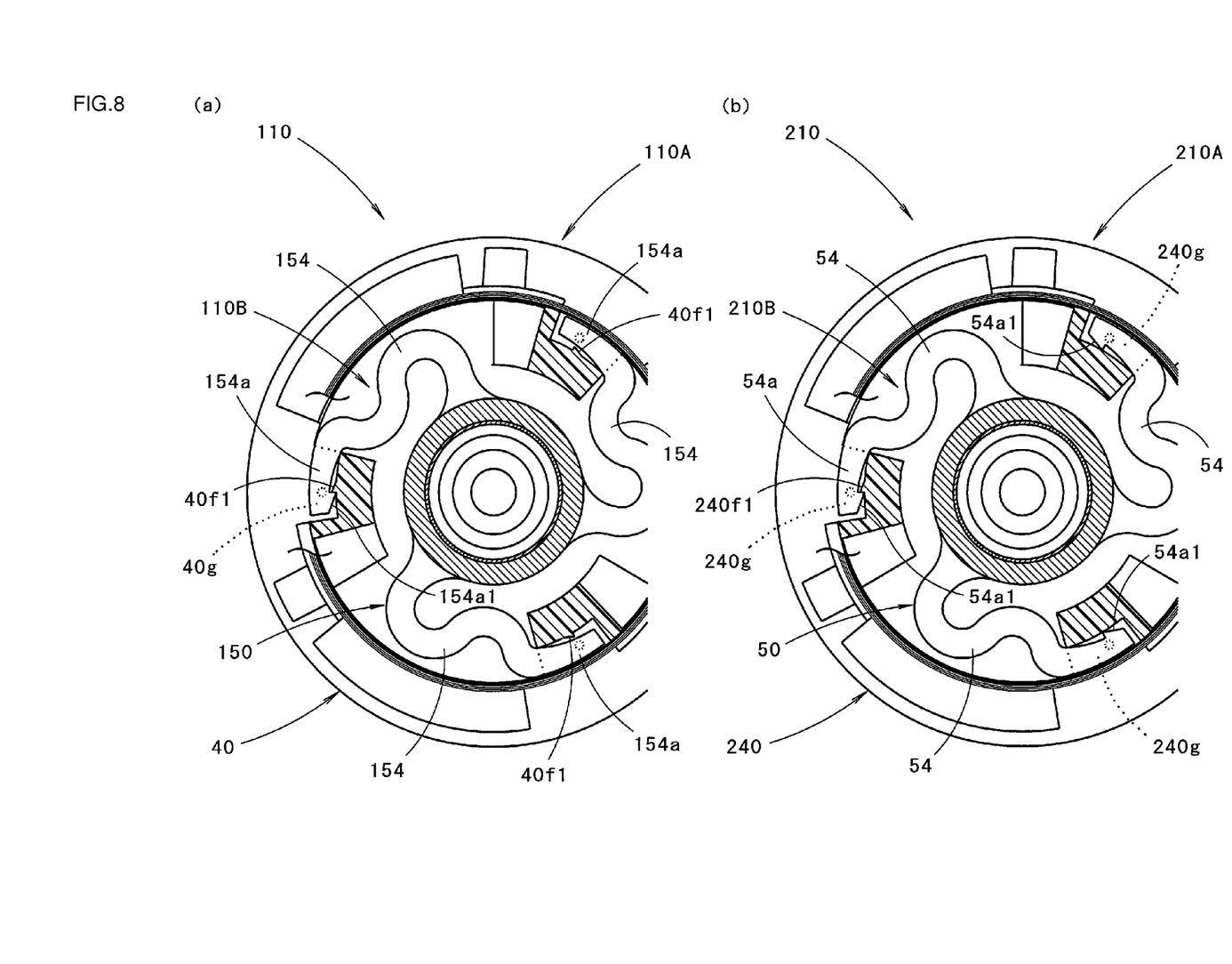

FIG. 8 (a) shows a main part of an electrodynamic exciter 110 according to the first variation of the embodiment shown in FIG. 5.

A configuration of the exciter 110 according to the first variation is basically the same as that of the exciter 10 of the above-described embodiment, except for the structure of a suspension 150.

In the suspension 150 according to the first variation, a wedge-shaped locking portion 154a1 is formed in only one of the three flexible arms 154a in the distal end 154a thereof. Thus, the engagement structure for separation prevention is provided only in a single position.

As in the first variation, since the locking portion 154a1 of the distal end 154a of the flexible arm 154 is engaged with the engaging portion 40f1 of the arm insertion slot 40g only in the single position in the circumferential direction, the suspension 150 is free from unnecessary tension, which is likely generated when the distal end 154a of each of the flexible arms 154 is inserted into each of the arm insertion slots 40g.

In this variation, the engaging portion 40f1 is formed in every arm insertion slot 40g of the coil support member 40. Thus, the locking portion 154a1 formed in the distal end 154a of the single flexible arm 154 can be brought into engagement with any of the engaging portions 40f1 respectively formed in the arm insertion slots 40g only by setting a lower unit 110B with respect to an upper unit 110A in any position of the three circumferential positions corresponding to the arm insertion slots 40g and then rotating the lower unit 110B in the circumferential direction in which the flexible arms 154 are extended.

Next, the second variation of the embodiment will be described.

FIG. 8 (b) shows a main part of an electrodynamic exciter 210 according to the second variation of the embodiment shown in FIG. 5.

A configuration of the exciter 210 according to the second variation is basically the same as that of the exciter 10 of the above-described embodiment, except for the structure of a coil support member 240.

In the coil support member 240 of the second variation, a wedge-shaped engaging portion 240f1 is formed in only one of the three arm insertion slots. Thus, the engagement structure for separation prevention is provided only in a single position.

As in the second variation, since the locking portion 54a1 of the distal end 54a of the flexible arm 54 is engaged with the engaging portion 240f1 of the arm insertion slot 240g only in the single position in a circumferential direction, the suspension 50 is free from unnecessary tension, which is likely generated when the distal end 54a of each of the flexible arms 54 is inserted into each of the arm insertion slots 240g.

In this variation, the locking portion 54a1 is formed in every flexible arm 54. Thus, any of the locking portions 54a1 respectively formed in the distal ends 54a of the flexible arms 54 can be brought into engagement with the engaging portion 240f1 of the single arm insertion slot 240g only by setting a lower unit 210B with respect to an upper unit 210A in any position of the three circumferential positions corresponding to the arm insertion slots 240g and then rotating the lower unit 210B in the circumferential direction in which the flexible arms 54 are extended.

Next, the third variation of the embodiment of the present invention will be described.

Figure 9:
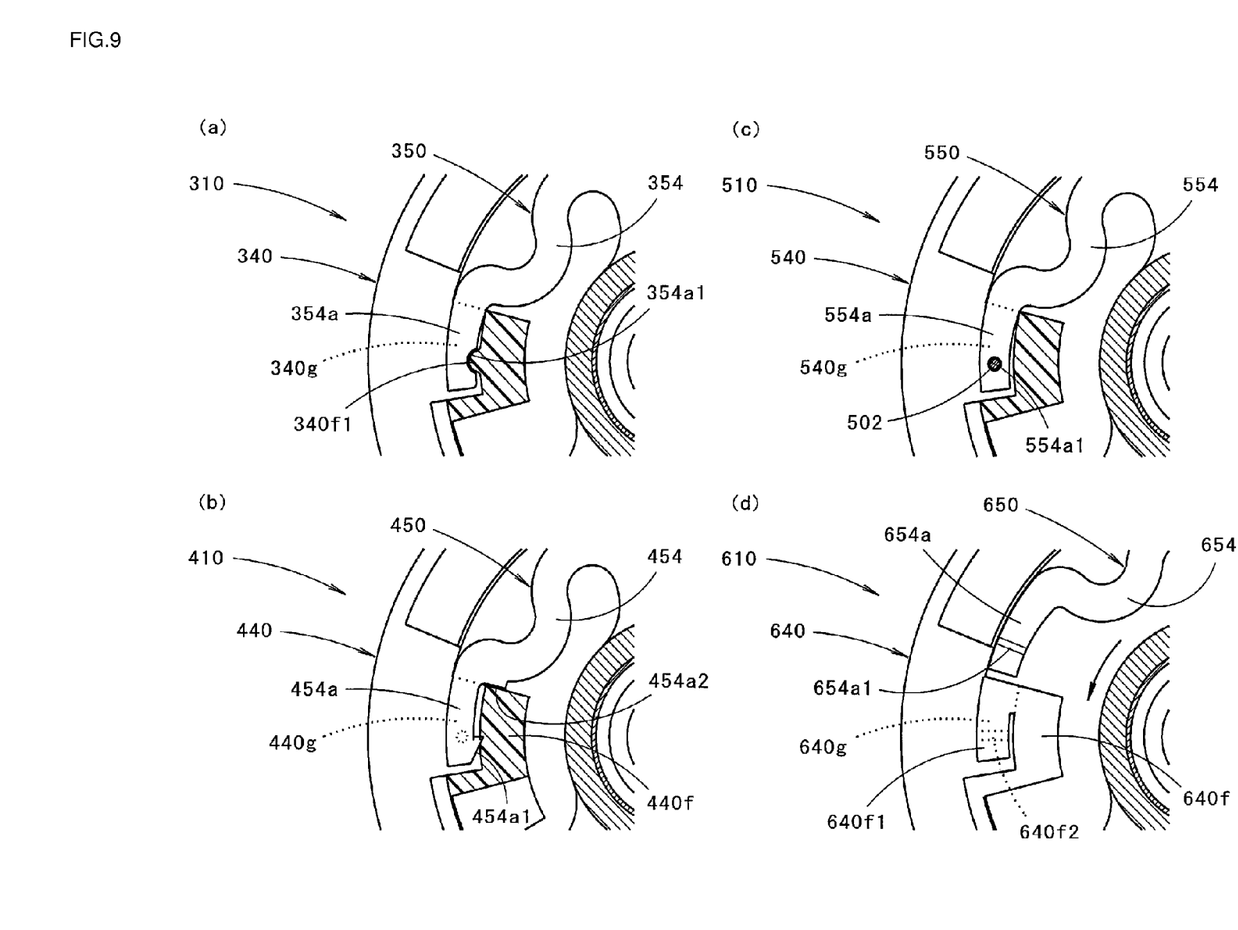

FIG. 9 (a) shows a main part of an electrodynamic exciter 310 according to the third variation of the embodiment shown in FIG. 6 (c).

A configuration of the exciter 310 according to the third variation is basically the same as that of the exciter 10 of the above-described embodiment, except for the engagement structure between a coil support member 340 and a suspension 350.

In the third variation, an arc-shaped protrusion 340f1 is formed in the inner edge of each of arm insertion slots 340g of the coil support member 340, while an arc-shaped recess portion 354a1 is formed in the inner edge of each of distal ends 354a of flexible arms 354. When the distal end 354a of each of the flexible arms 354 are inserted into each of the arm insertion slots 340g, the recess portion 354a1 of each of the flexible arms 354 is brought into engagement with the protrusion 340f1 of each of the arm insertion slots 340g, thereby preventing separation thereof.

The third variation also provides the same effect as the above-described embodiment.

Next, the fourth variation of the embodiment will be described.

FIG. 9 (b) shows a main part of an electrodynamic exciter 410 according to the fourth variation of the embodiment shown in FIG. 6 (c).

A configuration of the exciter 410 according to the fourth variation is basically the same as that of the exciter 10 of the above-described embodiment, except for the engagement structure between a coil support member 440 and a suspension 450.

In the fourth variation, the coil support member 440 has no engaging portion formed in each of arm insertion slots 440g thereof. When a distal end 454a of each of flexible arms 454 is inserted into each of the arm insertion slots 440g, a wedge-shaped locking portion 454a1 respectively formed in the distal end 454a of each of the flexible arms 454 bites into the inner edge of each of the arm insertion slots 440g. The locking portion 454a1 is thereby engaged with the inner edge of each of the arm insertion slots 440g, preventing separation thereof.

Further, as the distal end 454a of each of the flexible arms 454 is inserted into each of the arm insertion slots 440g in the circumferential direction in which the flexible arms 454 are extended, a stopper portion 454a2 formed behind the distal end 454a in each of the flexible arms 454 is brought contact with the trailing end surface of each of the second protrusions 440f of the coil support member 440, thereby preventing further insertion of the flexible arms 454.

The fourth variation also provides the same effect as the above-described embodiment.

Next, the fifth variation of the embodiment of the present invention will be described.

FIG. 9 (c) shows a main part of an electrodynamic exciter 510 according to the fifth variation of the embodiment shown in FIG. 6 (c).

A configuration of the exciter 510 according to the fifth variation is basically the same as that of the exciter 10 of the above-described variation, except for the engagement structure between a coil support member 540 and a suspension 550.

In the fifth variation, the coil support member 540 has no engaging portion formed in each of arm insertion slots 540g thereof, and each of flexible arms 554 has no locking portion formed in each of distal ends 554a thereof. Instead, a through-hole 554a1 vertically penetrating the distal end 554a is formed in each of the flexible arms 554.

After the distal end 554a of each of the flexible arms 554 is inserted into each of the arm insertion slots 540g, a pin 502 is inserted into the through-hole 554a1 to prevent the flexible arm 554 from being separated. The pin 502 may be inserted into, for example, a small hole like the adhesive injection hole 40j formed in the coil support member 540 before into the through-hole 554a1.

The fifth variation also provides the same effect as the above-described embodiment.

Next, the sixth variation of the embodiment will be described.

FIG. 9 (c) shows a main part of an electrodynamic exciter 610 according to the sixth variation of the embodiment shown in FIG. 6 (c).

A configuration of the exciter 610 according to the sixth variation is basically the same as that of the exciter 10 of the above-described, except for the engagement structure between a coil support member 640 and a suspension 650.

In the sixth variation, the coil support member 640 has no engaging portion formed in each of arm insertion slots 640g thereof, and each of flexible arms 654 has no locking portion formed in each of distal ends 654a thereof. Instead, a recess 654a1 extended in the diameter direction is formed in the bottom surface of the distal end 654a of each of the flexible arms 654, while each of second protrusions 640f of the coil support member 640 is formed like a cantilever in a manner a distal end thereof extends in the circumferential direction in which the flexible arms 654 are extended. Such extended distal end constitutes a bottom wall 640f1 of each of the arm insertion slots 640 and a protrusion 640f2 extended in the diameter direction is formed in the upper side of the bottom wall 640f1.

When the distal end 654a of each of the flexible arms 654 is inserted into each of the arm insertion slots 640g, the recess 654a1 is brought into engagement with the protrusion 640f2, thereby preventing separation of the flexible arms 654. Since the bottom wall 640f1 is likely bent due to above described configuration, the distal end 654a of each of the flexible arms 654 is allowed to be smoothly inserted into each of the arm insertion slots 640g.

The sixth variation also provides the same effect as the above-described embodiment.

The engagement structure of the coil support member 340, 440, 540, and 640 and the suspension 350, 450, 550, and 650 is respectively provided at three positions in the third to sixth variations, but the engagement structure may be provided at a single position or two positions among the three positions.

In addition, it should be understood that there are various equivalents and modification examples substitutable with the embodiment and the variations thereof.

DESCRIPTION OF SYMBOLS

10,110,210,310,410,510,610: electrodynamic exciter
10A, 110A, 210A: upper unit
10B, 110B, 210B: lower unit
10C: cover member
10Ca: cylindrical opening
10Cb: vent hole
10Cc: engaging opening
20: coil
22: bobbin
30: magnetic circuit unit
32: magnet
34: base
34a: ring-shaped stepped portion
36: yoke
36a: ring-shaped protrusion
38: rivet
38a: upper flange
38b: lower flange
40,240,340,440,540,640: coil support member
40a: upper surface
40b: bottom surface
40c: through-hole
40d: boss portion
40e: first protrusion
40f, 440f, 640f: second protrusion
40f1, 240f1: engaging portion
40g, 240g, 340g, 440g, 540g, 640g: arm insertion slot
40h: ring-shaped recess portion
40i: arm placement portion
40j: adhesive injection hole
40k: engaging protrusion
42: positioning pin
50, 150, 350, 450, 550, 650: suspension
52: center portion
54, 154, 354, 454, 554, 654 flexible arm
54a, 154a, 354a, 454a, 554a, 654a: distal end
54a1, 154a1, 454a1: locking portion
60: wiring code
62: connection portion
70: vehicle lamp
72: lamp body
74: translucent cover
74a: exciter mounting portion
74a1: screw hole
74a2: pin receiving hole
74a3, 74a4: raised portion
74b: flange portion
76: extension panel
78: molding
80: lighting unit
90: screw
340f1, 640f2: protrusion
354a1: recess portion
454a2: stopper portion
502: pin
554a1 through-hole
640f1: bottom wall
654a1: recess

What is claimed is:

1. An electrodynamic exciter adapted to be mounted to a vibration panel comprising:
   a coil;
   a magnetic circuit unit having a magnetic gap for receiving a lower end of the coil;
   a coil support member arranged on an upper side of the magnetic circuit unit to fixedly support the coil; and
   a suspension vertically displaceably supporting the magnetic circuit unit with respect to the coil support member,
   wherein the exciter is mounted to the vibration panel in an upper surface of the coil support member thereof,
   the suspension is provided with a plurality of flexible arms connecting the magnetic circuit unit and the coil support member at a plurality of positions,
   the plurality of flexible arms are formed extending in the same circumferential direction, each extending from a base end thereof on the side of the magnetic circuit unit toward a distal end thereof on the side of the coil support member in a planar view,
   a plurality of arm insertion slots, each having almost the same vertical width as each of the flexible arms, are formed at a plurality of circumferential positions of the coil support member,
   the distal end of each of the flexible arms is inserted into each of the arm insertion slots in the same circumferential direction in which the flexible arms are extended, and
   a separation prevention structure for preventing the distal end of each of the flexible arms from being separated from each of the arm insertion slots is provided between at least one of the flexible arms and the arm insertion slot into which the flexible arm is inserted.

2. The electrodynamic exciter of claim 1, wherein the separation prevention structure comprises an engagement structure for engaging the distal end of at least one of the flexible arms with the arm insertion slot into which the flexible arm is inserted.

3. The electrodynamic exciter of claim 2, wherein each of the plurality of flexible arms is arranged on an inner side of the coil.

4. The electrodynamic exciter of claim 3, wherein each of the plurality of flexible arms is windingly extended in the same circumferential direction in which the flexible arms are extended.

5. The electrodynamic exciter of claim 1, wherein each of the plurality of flexible arms is arranged on an inner side of the coil.

6. The electrodynamic exciter of claim 5, wherein each of the plurality of flexible arms is windingly extended in the same circumferential direction in which the flexible arms are extended.

7. A vehicle lamp attached to a front side or a rear side of a vehicle comprising the electrodynamic exciter of claim 1 mounted thereto.

8. The vehicle lamp of claim 7, wherein the separation prevention structure comprises an engagement structure for engaging the distal end of at least one of the flexible arms with the arm insertion slot into which the flexible arm is inserted.

9. The vehicle lamp of claim 8, wherein each of the plurality of flexible arms is arranged on an inner side of the coil.

10. The vehicle lamp of claim 9, wherein each of the plurality of flexible arms is windingly extended in the same circumferential direction in which the flexible arms are extended.

11. The vehicle lamp of claim 7, wherein each of the plurality of flexible arms is arranged on an inner side of the coil.

12. The vehicle lamp of claim 11, wherein each of the plurality of flexible arms is windingly extended in the same circumferential direction in which the flexible arms are extended.

13. The vehicle lamp of claim 7 comprising a lamp body and a translucent cover attached to a front opening of the lamp body, wherein the translucent cover constitutes the vibration panel.

14. The vehicle lamp of claim 8 comprising a lamp body and a translucent cover attached to a front opening of the lamp body, wherein the translucent cover constitutes the vibration panel.

15. The vehicle lamp of claim 9 comprising a lamp body and a translucent cover attached to a front opening of the lamp body, wherein the translucent cover constitutes the vibration panel.

16. The vehicle lamp of claim 10 comprising a lamp body and a translucent cover attached to a front opening of the lamp body, wherein the translucent cover constitutes the vibration panel.

17. The vehicle lamp of claim 11 comprising a lamp body and a translucent cover attached to a front opening of the lamp body, wherein the translucent cover constitutes the vibration panel.

18. The vehicle lamp of claim 12 comprising a lamp body and a translucent cover attached to a front opening of the lamp body, wherein the translucent cover constitutes the vibration panel.

* * * * *